United States Patent
Dayal et al.

(10) Patent No.: US 12,112,639 B2
(45) Date of Patent: Oct. 8, 2024

(54) SYSTEM AND METHOD FOR MONITORING AND MAINTAINING A FLEET OF ELECTRIC VEHICLES

(71) Applicant: Electriphi Inc, San Francisco, CA (US)

(72) Inventors: Sanjay Dayal, San Francisco, CA (US); Muffaddal Ghadiali, San Francisco, CA (US)

(73) Assignee: Electriphi Inc, San Francisco, CA (US)

( * ) Notice: Subject to any disclaimer, the term of this patent is extended or adjusted under 35 U.S.C. 154(b) by 423 days.

(21) Appl. No.: 17/131,851

(22) Filed: Dec. 23, 2020

(65) Prior Publication Data

US 2022/0198931 A1 Jun. 23, 2022

(51) Int. Cl.
*G08G 1/00* (2006.01)
*G06Q 10/06* (2023.01)
*G07C 5/08* (2006.01)

(52) U.S. Cl.
CPC .............. *G08G 1/20* (2013.01); *G06Q 10/06* (2013.01); *G07C 5/0816* (2013.01); *G07C 5/085* (2013.01)

(58) Field of Classification Search
CPC .......... G08G 1/20; G08G 1/127; G08G 1/22; G08G 1/202; G06Q 10/06; G06Q 10/063; G06Q 50/30; G07C 5/0816; G07C 5/085; G07C 5/008; G05D 1/0287
See application file for complete search history.

(56) References Cited

U.S. PATENT DOCUMENTS

| | | | |
|---|---|---|---|
| 8,560,161 B1 * | 10/2013 | Kator | G07C 5/008 701/29.6 |
| 8,838,318 B2 | 9/2014 | Segawa et al. | |
| 10,042,359 B1 * | 8/2018 | Konrardy | G06Q 50/30 |
| 10,386,197 B2 | 8/2019 | Salowitz et al. | |
| 10,459,444 B1 * | 10/2019 | Kentley-Klay | G05D 1/0027 |
| 10,782,143 B2 | 9/2020 | Chintakindi et al. | |
| 10,810,504 B1 | 10/2020 | Fields et al. | |
| 2009/0210081 A1 * | 8/2009 | Sustaeta | H04L 67/125 715/702 |

(Continued)

FOREIGN PATENT DOCUMENTS

WO 2020064657 A1 4/2020

*Primary Examiner* — Thomas Ingram
*Assistant Examiner* — Michael J Herrera
(74) *Attorney, Agent, or Firm* — Jason C. Cameron

(57) ABSTRACT

A system for monitoring and maintaining a fleet of electric vehicles is disclosed. A processing subsystem includes an electric vehicle data tracking module which tracks vehicle data associated with each electric vehicle in the fleet of electric vehicles. An electric vehicle objective computation module utilizes one or more predefined fleet-level objectives corresponding to each of the electric vehicles in the fleet of the electric vehicles, ranks the one or more predefined fleet-level objectives in a predefined order. A fleet score computation module employs a predefined score model to calculate a vehicle level score corresponding to each of the one or more fleet level objectives ranked in predefined order, calculates a fleet level score, computes a fleet-level aggregate score for the fleet of the electric vehicles. A generic fleet action implementation module utilizes an implemented fleet action model for predicting maintenance and performance of the fleet of the electric vehicles.

18 Claims, 6 Drawing Sheets

(56) References Cited

U.S. PATENT DOCUMENTS

| | | | | |
|---|---|---|---|---|
| 2011/0082621 | A1* | 4/2011 | Berkobin | B60L 58/16 |
| | | | | 701/31.4 |
| 2012/0191495 | A1* | 7/2012 | McIntosh | G07C 5/085 |
| | | | | 705/7.11 |
| 2014/0129076 | A1* | 5/2014 | Mouchet | B60C 23/0479 |
| | | | | 701/1 |
| 2016/0253924 | A1* | 9/2016 | Kwak | G07C 5/02 |
| | | | | 701/123 |
| 2016/0368508 | A1* | 12/2016 | Manci | B60W 50/14 |
| 2017/0006135 | A1* | 1/2017 | Siebel | G06Q 10/06 |
| 2017/0255966 | A1* | 9/2017 | Khoury | B60W 40/00 |
| 2017/0309094 | A1* | 10/2017 | Farahat | G05B 23/0283 |
| 2018/0268621 | A1* | 9/2018 | Oz | G07C 5/02 |
| 2018/0342034 | A1* | 11/2018 | Kislovskiy | G06Q 10/06315 |
| 2019/0114564 | A1 | 4/2019 | Ferguson et al. | |
| 2019/0171187 | A1* | 6/2019 | Cella | G06N 3/126 |
| 2019/0220036 | A1* | 7/2019 | Weslosky | G06Q 10/06 |
| 2019/0318549 | A1* | 10/2019 | Zeira | G06Q 10/1097 |
| 2019/0385386 | A1* | 12/2019 | Davidson | G07C 5/0858 |
| 2020/0160709 | A1* | 5/2020 | Ramot | G06F 16/29 |
| 2020/0294323 | A1* | 9/2020 | Zeng | B60L 7/10 |
| 2020/0309543 | A1* | 10/2020 | Voznesensky | G08G 1/096811 |
| 2020/0322703 | A1* | 10/2020 | Bures | G06F 16/27 |
| 2021/0107545 | A1* | 4/2021 | Howard | B61L 27/16 |
| 2021/0124352 | A1* | 4/2021 | Candido | G08G 5/0013 |
| 2021/0157312 | A1* | 5/2021 | Cella | G01M 13/045 |
| 2022/0036302 | A1* | 2/2022 | Cella | G06Q 10/0835 |
| 2022/0122197 | A1* | 4/2022 | Hanrieder | G06Q 10/06 |

\* cited by examiner

SYSTEM AND METHOD FOR MONITORING AND MAINTAINING A FLEET OF ELECTRIC VEHICLES

BACKGROUND

Embodiments of the present disclosure relate to a fleet management system and more particularly to a system and a method for monitoring and maintaining a fleet of electric vehicles.

Fleet management is a system of technologies and procedures designed to help organizations and fleet managers to run electric vehicle fleets at their most efficient capacity. As the organizations face growing demand and other industry challenges, fleet management is important to differentiate the organizations in a crowded market, improve productivity and safety and positively impact the bottom line. Generally, the fleet management approach is utilized by the organizations that incorporates commercial vehicles for use within the business. The fleet management controls an entire lifecycle of the commercial vehicles alongside reducing associated risk, improving efficiency, increasing productivity, and ensuring compliance with legislation. Various fleet management systems are available which is applicable for managing both electric vehicles as well as fuel-based vehicles.

Conventionally, the fleet management system which is available includes acquiring data of the fleet of electric vehicles through one or more sensors and thereby helps in monitoring the fleet of the electric vehicles from a remote environment. However, such a conventional system does not consider one or more plans or goals for efficient fuel management of the fleet of the electric vehicles, achieving desired performance of the fleet of the electric vehicles along with maintenance of vehicle health and safety. Moreover, such a conventional system is unable to provide one or more recommendations for improving performance of the fleet of the electric vehicles over time.

Hence, there is a need for an improved system and a method for monitoring and maintaining a fleet of electric vehicles in order to address the aforementioned issues.

BRIEF DESCRIPTION

In accordance with an embodiment of the present disclosure, a system for monitoring and maintaining a fleet of electric vehicles is disclosed. The system includes a processing subsystem hosted on a server and configured to execute on a network to control bidirectional communications among a plurality of modules. The processing subsystem includes an electric vehicle and/or the electric vehicle fleet charging infrastructure data tracking module configured to track vehicle and/or the electric vehicle fleet charging infrastructure data associated with each electric vehicle in the fleet of electric vehicles collected via one or more sensors, wherein the one or more sensors are deployed in each of the fleet of the electric vehicles and/or the electric vehicle fleet charging infrastructure. The processing subsystem also includes a fleet vehicle profile management module operatively coupled to the electric vehicle and/or the electric vehicle fleet charging infrastructure data tracking module. The fleet vehicle profile management module is configured to generate a unique vehicle profile corresponding to each of the electric vehicles in the fleet of the electric vehicles upon tracking of the vehicle data. The fleet vehicle profile management module is also configured to maintain the vehicle data linked with the unique vehicle profile generated for each of the electric vehicles in the fleet of electric vehicles in a vehicle data repository. The processing subsystem also includes an electric vehicle objective computation module operatively coupled to the fleet vehicle profile management module. The electric vehicle objective computation module is configured to utilize one or more predefined fleet-level objectives corresponding to each of the electric vehicle in the fleet of the electric vehicles upon accessing the unique vehicle profile generated, wherein the one or more predefined fleet-level objectives are maintained in the vehicle data repository. The electric vehicle objective computation module is also configured to rank the one or more predefined fleet-level objectives in a predefined order for operation of each of the electric vehicles in the fleet of the electric vehicles by interfacing with a fleet manager. The processing subsystem also includes a fleet score computation module operatively coupled to the electric vehicle objective computation module. The fleet score computation module is configured to employ a predefined score model to calculate a vehicle level score corresponding to each of the one or more fleet level objectives ranked in the predefined order for each of the electric vehicles in the fleet of the electric vehicles. The fleet score computation module is also configured to calculate a fleet level score corresponding to each of the one or more fleet level objectives ranked in the predefined order for the fleet of the electric vehicles by combining the vehicle level score calculated. The fleet score computation module is also configured to compute a fleet-level aggregate score for the fleet of the electric vehicles based on a combination of each of the fleet level scores calculated using a score combination technique. The processing subsystem also includes a generic fleet action implementation module operatively coupled to the fleet score computation module. The generic fleet action implementation module is configured to utilize an implemented fleet action model based on the fleet-level aggregate score, fleet level scores, and vehicle level scores for predicting maintenance and performance of the fleet of the electric vehicles through a plurality of vehicle or other fleet management specific actions.

In accordance with another embodiment of the present disclosure, a method for monitoring and maintaining a fleet of electric vehicles is disclosed. The method includes tracking, using an electric vehicle data tracking module, vehicle data associated with each electric vehicle in the fleet of electric vehicles collected via one or more sensors, wherein the one or more sensors are deployed in each of the fleet of the electric vehicles and/or the electric vehicle fleet charging infrastructure. The method also includes generating, by a fleet vehicle profile management module, a unique vehicle profile corresponding to each of the electric vehicles in the fleet of the electric vehicles upon tracking of the vehicle data and/or the electric vehicle fleet charging infrastructure data. The method also includes maintaining, by the fleet vehicle profile management module, the vehicle data linked with the unique vehicle profile generated for each of the electric vehicles in the fleet of electric vehicles in a vehicle data repository. The method also includes utilizing, by an electric vehicle objective computation module, one or more predefined fleet-level objectives corresponding to each of the electric vehicle in the fleet of the electric vehicles upon accessing the unique vehicle profile generated, wherein the one or more predefined fleet-level objectives are maintained in the vehicle data repository. The method also includes ranking, by the electric vehicle objective computation module, the one or more predefined fleet-level objectives in a predefined order for operation of each of the electric vehicles in the fleet of the electric vehicles by interfacing with a fleet manager. The method also includes employing, by a fleet score computation module, a predefined score model to calculate a vehicle level score corresponding to each of the one or more fleet level objectives ranked in the predefined order for each of the electric vehicles in the fleet of the electric vehicles. The method also includes calculating, by the fleet score computation module, a fleet level score corresponding to each of the one or more fleet level objectives ranked in the predefined order for the fleet of the electric vehicles by combining the vehicle level score calculated. The method also includes computing, by the fleet score computation module, a fleet-level aggregate score for the fleet of the electric vehicles based on a combination of each of the fleet level scores calculated using a score combination technique. The method also includes utilizing, by a generic fleet action implementation module, an implemented fleet action model based on the fleet-level aggregate score for predicting maintenance and performance of the fleet of the electric vehicles through a plurality of vehicle specific actions.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
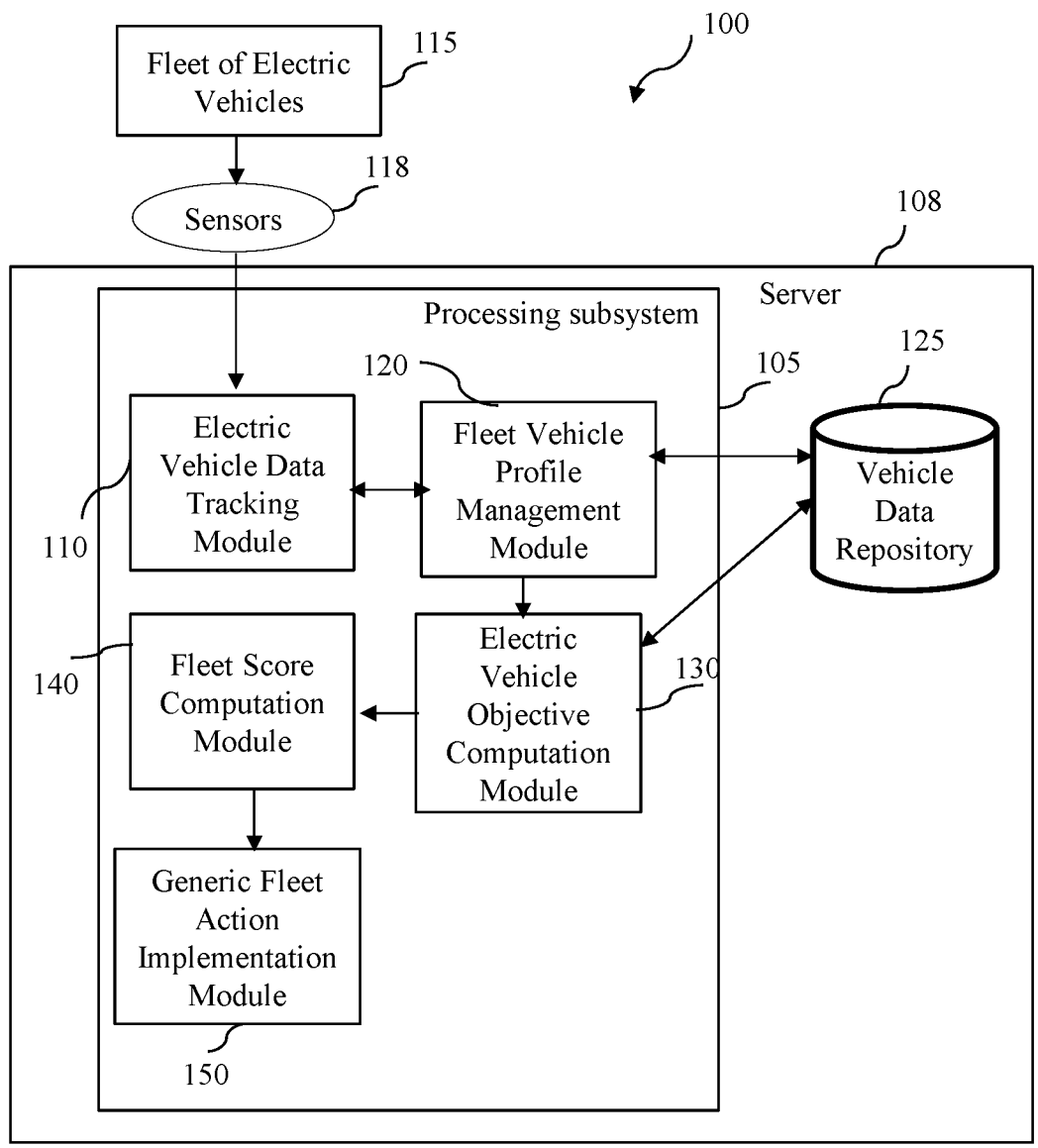
FIG. 1 is a block diagram of a system for monitoring and maintaining a fleet of electric vehicles in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for monitoring and maintaining a fleet of electric vehicles. The system includes a processing subsystem hosted on a server and configured to execute on a network to control bidirectional communications among a plurality of modules. The processing subsystem includes an electric vehicle data tracking module configured to track vehicle data associated with each electric vehicle in the fleet of electric vehicles collected via one or more sensors, wherein the one or more sensors are deployed in each of the fleet of the electric vehicles and its associated infrastructure. The processing subsystem also includes a fleet vehicle profile management module operatively coupled to the electric vehicle data tracking module. The fleet vehicle profile management module is configured to generate a unique vehicle profile corresponding to each of the electric vehicles in the fleet of the electric vehicles upon tracking of the vehicle data. The fleet vehicle profile management module is also configured to maintain the vehicle data linked with the unique vehicle profile generated for each of the electric vehicles in the fleet of electric vehicles in a vehicle data repository. The processing subsystem also includes an electric vehicle objective computation module operatively coupled to the fleet vehicle profile management module. The electric vehicle objective computation module is configured to utilize one or more predefined fleet-level objectives corresponding to each of the electric vehicle in the fleet of the electric vehicles upon accessing the unique vehicle profile generated, wherein the one or more predefined fleet-level objectives are maintained in the vehicle data repository. The electric vehicle objective computation module is also configured to rank the one or more predefined fleet-level objectives in a predefined order for operation of each of the electric vehicles in the fleet of the electric vehicles by interfacing with a fleet manager. The processing subsystem also includes a fleet score computation module operatively coupled to the electric vehicle objective computation module. The fleet score computation module is configured to employ a predefined score model to calculate a vehicle level score corresponding to each of the one or more fleet level objectives ranked in the predefined order for each of the electric vehicles in the fleet of the electric vehicles. The fleet score computation module is also configured to calculate a fleet level score corresponding to each of the one or more fleet level objectives ranked in the predefined order for the fleet of the electric vehicles by combining the vehicle level score calculated. The fleet score computation module is also configured to compute a fleet-level aggregate score for the fleet of the electric vehicles based on a combination of each of the fleet level scores calculated using a score combination technique. The processing subsystem also includes a generic fleet action implementation module operatively coupled to the fleet score computation module. The generic fleet action implementation module is configured to utilize an implemented fleet action model based on the fleet-level aggregate score for predicting maintenance and performance of the fleet of the electric vehicles through a plurality of vehicle specific actions.

FIG. 1 is a block diagram of a system 100 for monitoring and maintaining a fleet of electric vehicles in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as wi-fi, Bluetooth, Zigbee, near field communication (NFC), infra-red communication (RFID) or the like. The processing subsystem 105 includes an electric vehicle data tracking module 110 configured to track vehicle data associated with each electric vehicle in the fleet of electric vehicles 115 collected via one or more sensors 118, wherein the one or more sensors 118 are deployed in each of the fleet of the electric vehicles 115. In one embodiment, the vehicle data associated with each of the electric vehicle in the fleet of the electric vehicles may include at least one of vehicle location data, vehicle dynamics data, electric vehicle power discharging characteristics data, electric vehicle recharging characteristics data, operator characteristics data, electric vehicle distance data, vehicle ridership data, electric vehicle environment exposure data, electric vehicle maintenance data, route the electric vehicle serviced data, electric vehicle's charging infrastructure data, driver behavior data, electric vehicle maintenance data, or a combination thereof. In a specific embodiment, the one or more sensors may include, but not limited to, an inertial measurement unit sensor, a brake position sensor, an accelerator position sensor, a geospatial location sensor and the like. In some embodiment, the fleet of the electric vehicles may include a fleet of electric bikes, a fleet of electric buses, a fleet of electric vans, a fleet of electric cars, a fleet of electric trains, a fleet of electric trams, a fleet of electric UAVs, a fleet of utility vehicles, or a fleet of electric trolleys.

In such embodiment, the vehicle location data may include data of one or more georeferenced or otherwise routes traversed by each of the electric vehicles. The data of the one or more georeferenced routes are derived based on one or more time series values of geospatial locations. In one implementation, the system records timestamped geospatial locations and other time series data of an electric vehicle over time. For example, the system may record the one or more time series values of the geospatial locations recorded by a geospatial sensor which is integrated into the electric vehicle, arranged in a black box located in each of the electric vehicle, or integrated into mobile computing devices issued to operators operating each of the electric vehicle in the feet of the electric vehicles over time. Based on the one or more timestamped geospatial locations of each of the electric vehicles collected over time, the electric vehicle data tracking module automatically derives a georeferenced route traversed by the vehicle, along with other time series data of the electric vehicle. The electric vehicle data tracking module 110 calculates one or multiple unique routes that each of the electric vehicle has traversed in the past based on these timestamped geospatial location data, such as including: common routes, common stops along the one or more georeferenced routes, common or average durations of stops along the one or more georeferenced routes, specific traffic lanes traversed along the one or more georeferenced routes and the like.

In another embodiment, the vehicle recharging characteristics data may include one or more timestamped values representative of battery current draw and energy delivery rate, battery current supply rate and energy supply rate, battery charge state, battery temperature values or a combination thereof. In one embodiment, the vehicle data may include acceleration and deceleration data of each of the electric vehicles in the fleet of the electric vehicles. In such embodiment, the acceleration and the deceleration data may include, but not limited to, longitudinal, and vertical accelerations recorded at a rate of 10 Hz throughout operation of the electric vehicle by an accelerometer integrated into each of the electric vehicle or integrated into an operator's mobile computing device. The electric vehicle data tracking module 110 further accesses timestamped, georeferenced accelerator and brake-related data for each of the electric vehicle throughout its operation, such as the accelerator positions recorded by an accelerometer sensor within the electric vehicle, brake positions recorded by a brake sensor within the electric vehicle, a ratio of braking with mechanical wheel brakes versus regenerative braking with drive motor, a rate or quantity of energy recaptured and supplied to a battery in the electric vehicle during braking, a rate or quantity of energy supplied by the battery in the vehicle during acceleration and the like. The electric vehicle data tracking module 110 also similarly access timestamped, georeferenced steering angle data, such as collected by a steering angle sensor integrated into the electric vehicle in the fleet of the electric vehicles.

In a particular embodiment, the vehicle data may also include environmental exposure data which may include ambient temperature, ambient humidity, ultraviolet exposure, rain, or snow precipitation in the one or more georeferenced routes traversed by each of the electric vehicles in the fleet of the electric vehicles. In another embodiment, the electric vehicle maintenance data may include at least one of date and description of replacement of vehicle tyres, date and description of battery repair and replacement, date and description of motor repair and replacement, date and description of compression repair and replacement, date of interior or exterior cleaning of the electric vehicle, date and description of aesthetic repairs performed on the electric vehicle or a combination thereof. In yet another embodiment, the operator data may include at least one of a date of operation of each of the electric vehicle by an operator, a name of the operator operated each of the electric vehicle, a time of operation of each of the electric vehicle by the operator, a location of operation of the electric vehicle performed by the operator or a combination thereof. As used herein, the term 'operator' is defined as a driver operating each of the electric vehicles in the fleet of the electric vehicles. In one embodiment, the ridership data may include a location and time details of one or more riders along the one or more georeferenced routes, wherein the location and the time details are obtained by combination of one or more timestamps of fare payments by the one or more riders at each of the electric vehicle and concurrent georeferenced location data of each of the electric vehicle or time-referenced durations for detection of each unique face of the one or more riders in a captured video feed and concurrent georeferenced location data of each of the electric vehicle.

The processing subsystem 105 also includes a fleet vehicle profile management module 120 operatively coupled to the electric vehicle data tracking module 110. The fleet vehicle profile management module 120 is configured to generate a unique vehicle profile corresponding to each of the electric vehicles in the fleet of the electric vehicles upon tracking of the vehicle data. The unique vehicle profile for each electric vehicle in the fleet of the electric vehicles is linked with a unique vehicle identification number (VIN). In a specific embodiment, the vehicle data may be entered into the unique vehicle profile linked with the unique VIN by manually scanning a unique code in each of the electric vehicles in the fleet of electric vehicles. In another embodiment, the vehicle data upon tracking may be entered into the unique vehicle profile by querying a vehicle data repository. The fleet vehicle profile management module 120 is also configured to maintain the vehicle data linked with the unique vehicle profile generated for each of the electric vehicles in the fleet of electric vehicles in the vehicle data repository. In one embodiment, the vehicle data repository 125 is also configured to store static data representative of each of the electric vehicles in the fleet of the electric vehicles. In such embodiment, the static data may include at least one of a model details of the electric vehicle, a type of the electric vehicle, a class of the electric vehicle, a curb weight of the electric vehicle, a load capacity of the electric vehicle, a rider capacity of the electric vehicle, a date of manufacture of the electric vehicle, a date of deployment of the electric vehicle, a battery of the electric vehicle, a motor size of the electric vehicle or a combination thereof.

The processing subsystem 105 also includes an electric vehicle objective computation module 130 operatively coupled to the fleet vehicle profile management module 120. The electric vehicle objective computation module 130 is configured to utilize one or more predefined fleet-level objectives corresponding to each of the electric vehicle in the fleet of the electric vehicles 115 upon accessing the unique vehicle profile, wherein the one or more predefined fleet-level objectives are maintained in the vehicle data repository 125. As used herein, the term 'fleet-level objectives' is defined as one or more goals for the fleet of electric vehicles to achieve optimal performance. In one embodiment, the one or more predefined fleet-level objectives may include at least one of maximizing utilization, achieving target equipment life, maximizing equipment reliability, maximizing battery life, maximizing capacity over effective operating life of the electric vehicle, minimizing probability of equipment failures, minimizing environmental impact or a combination thereof. In one implementation, a fleet manager portal may present the one or more predefined fleet-level objectives to a fleet manager, and the fleet manager can selectively activate and deactivate the one or more predefined fleet-level objectives, such as by selecting adjacent checkboxes or selecting the one or more predefined fleet level objectives from a dropdown menu presented in the fleet manager portal. Alternatively, the fleet manager portal may present the one or more predefined fleet-level objectives and prompt a user to prioritize or rank such objectives such as by entering a priority value e.g., between "0" and "10" adjacent to each objective or moving a particular objective within the one or more predefined fleet-level objectives to indicate rank or priority.

In another scenario, the electric vehicle objective computation module 130 is also configured to rank the one or more predefined fleet-level objectives in a predefined order for operation of each of the electric vehicles in the fleet of the electric vehicles by interfacing with the fleet manager. The one or more predefined fleet level objectives assigned to one electric vehicle in the fleet of the electric vehicles are stored as a record in the unique vehicle profile associated with this particular vehicle. The electric vehicle objective computation module 130 repeats this process for each individual electric vehicle and the fleet of the electric vehicles of the same or similar make, model, class, or type, and the like to populate corresponding unique vehicle profiles with the one or more predefined fleet-level objectives.

The processing subsystem 105 also includes a fleet score computation module 140 operatively coupled to the electric vehicle objective computation module 130. The fleet score computation module 140 is configured to employ a predefined score model to calculate a vehicle level score corresponding to each of the one or more fleet level objectives ranked in the predefined order for each of the electric vehicles in the fleet of the electric vehicles. The vehicle level score is calculated for each of the electric vehicles corresponding to each of the one or more predefined fleet-level objectives on a scale from e.g., zero to hundred. The fleet score computation module 140 is also configured to calculate a fleet level score corresponding to each of the one or more fleet level objectives ranked in the predefined order for the fleet of the electric vehicles by combining the vehicle level score calculated. The fleet score computation module is configured to retrieve the predefined score model for a particular objective, pass a vector or graph representing each of the electric vehicle in the fleet of the electric vehicles into the predefined score model for the particular objective to calculate one vehicle-level score for this objective for each vehicle. Also, the fleet score computation module combines the vehicle-level score by calculating an average or non-linear combination, such as with lower vehicle-level score weighted higher to calculate the fleet-level score for a particular fleet-level objective.

The fleet score computation module 140 is also configured to compute a fleet-level aggregate score for the fleet of the electric vehicles based on a combination of each of the fleet level scores calculated using a score combination technique. In one embodiment, the score combination technique for computation of the fleet-level aggregate score may include a weighted average of the fleet level score calculated for the fleet of the electric vehicles according to weights or rank assigned to the one or more predefined fleet-level objectives.

In a specific embodiment, the fleet score computation module 140 is also configured to calculate a change in the fleet level scores and the fleet-level aggregate scores respectively of the fleet of the electric vehicles with respect to a predefined time interval. In such embodiment, the predefined time interval may include, but not limited to, a current day, week, month, quarter, year, or since the fleet manager last accessed the fleet manager portal. The fleet score computation module is also configured to derive correlations for injecting into a fleet action model based on the change detected between the fleet level scores and the fleet-level aggregate scores, respectively. For example, for each fleet level objective, the fleet score computation module calculates a trendline for historical objective-specific scores for this objective up to a current time implement a low-pass filter to reject noise in this trendline and calculates a derivative of the trendline at the current time, such as total rate of change over the past 24 hours, the past week, the past month, the past quarter, and/or the past year.

The processing subsystem 105 also includes a generic fleet action implementation module 150 operatively coupled to the fleet score computation module 140. The generic fleet action implementation module 150 is configured to utilize an implemented fleet action model based on the fleet-level aggregate score for predicting maintenance and performance of the fleet of the electric vehicles through a plurality of vehicle specific actions. In one embodiment, the plurality of vehicle specific actions may include at least one of redistributing operators of the feet of electric vehicles, redistributing the fleet of electric vehicles across the one or more georeferenced routes, changing charge timings for the fleet of the electric vehicles, replacing an individual electric vehicle in the fleet of the electric vehicles, changing a target battery capacity of the fleet of the electric vehicles, replacing drivetrain components within the fleet of the electric vehicles, repairing the fleet of the electric vehicles or a combination thereof. The generic fleet action model predicts how objective-specific and the fleet-level aggregate scores for a generic electric vehicle fleet may be affected by various vehicle specific actions.

Figure 2:
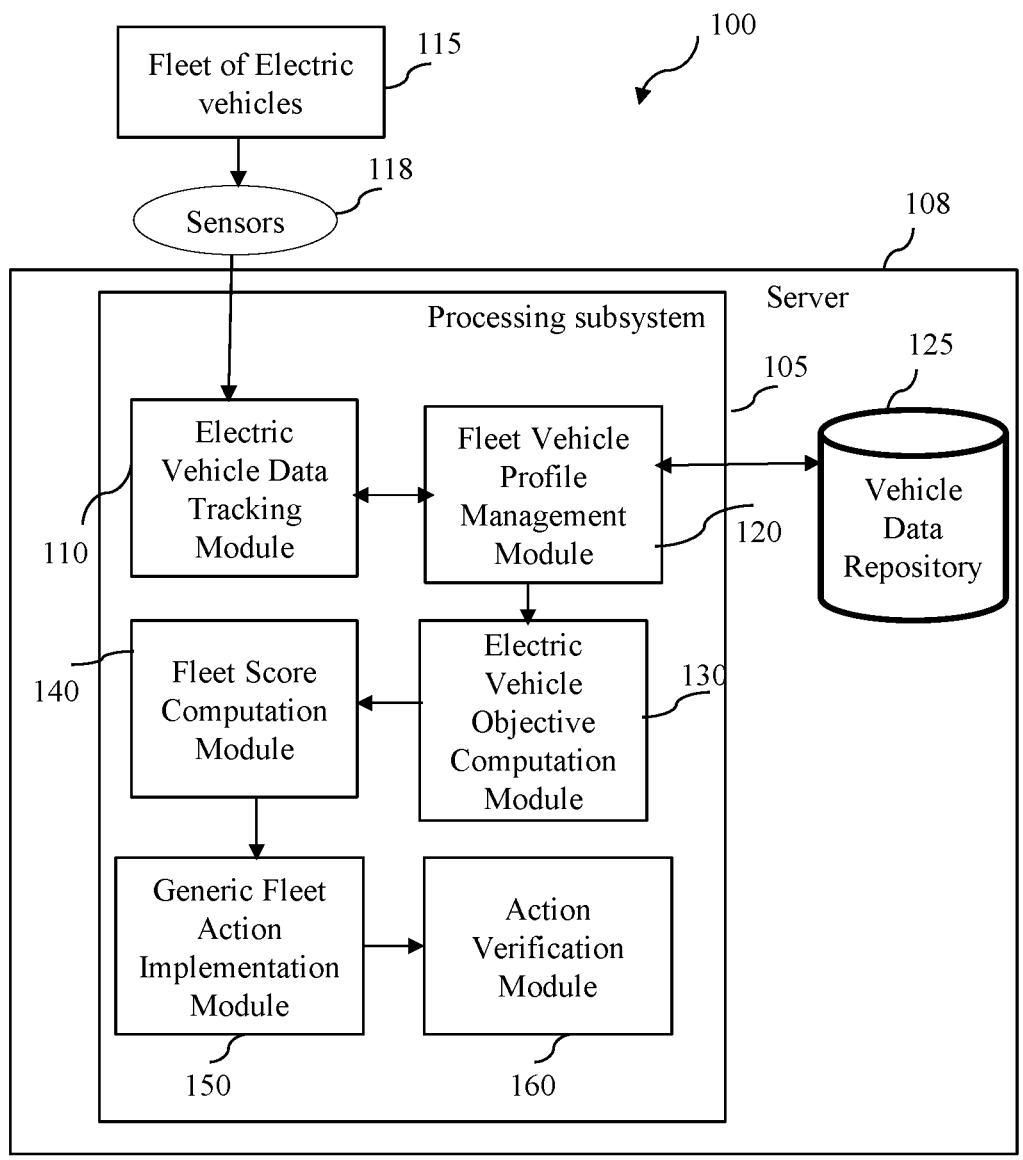
FIG. 2 represents a schematic representation of an embodiment for monitoring and maintaining a fleet of electric vehicles of a system of FIG. 1 in accordance with an embodiment of the present disclosure.

FIG. 2 represents a schematic representation of an embodiment for monitoring and maintaining a fleet of electric vehicles of a system 100 of FIG. 1 in accordance with an embodiment of the present disclosure. As described in aforementioned FIG. 1, the system includes a processing subsystem 105 which includes an electric vehicle data tracking module 110, a fleet vehicle profile management module 120, an electric vehicle objective computation module 130, a fleet score computation module 140 and a generic fleet action implementation module 150. In addition, the processing subsystem 105 also includes an action verification module 160 configured to receive verification of implementation of the plurality of vehicle specific actions across the fleet of the electric vehicles via one or more verification means. In one embodiment, the one or more verification means may include, but not limited to, a verification of automated scheduled implementation details of the plurality of vehicle specific actions, a verification of implementation details of the plurality of vehicle specific actions based on manual intervention and the like. The action verification module 160 collects vehicle operational data from the fleet, schedules or prompts the plurality of vehicle specific actions, verifies whether the plurality of vehicle specific actions implemented or not, and detects correlations between such actions and changes in the fleet-level or vehicle-level outcomes for the fleet of the electric vehicles. The action verification module 160 also leverages the vehicle data and correlations to construct a custom fleet action model and/or a custom vehicle action model that predicts how certain actions performed across the fleet or at particular vehicles within the fleet may increase or decrease objective-specific or aggregate scores for individual vehicles of the fleet more generally. Such implemented fleet action model which is utilized for the fleet of the electric vehicles helps in scheduling or recommending the plurality of vehicle specific actions within the fleet in the near future.

Figure 3:
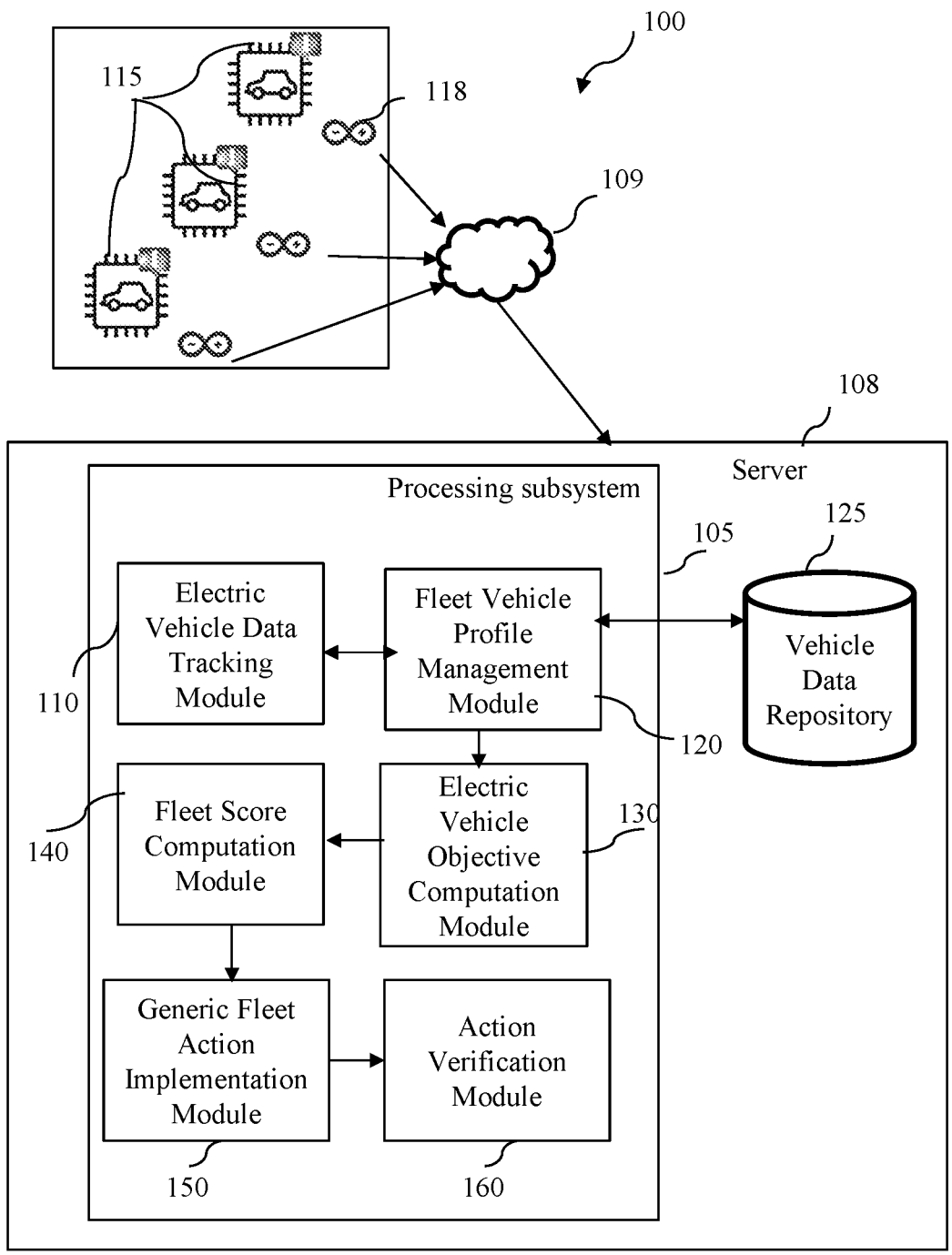
FIG. 3 illustrates a schematic representation of an exemplary embodiment of a system for monitoring and maintaining a fleet of electric vehicles of FIG. 1 in accordance with an embodiment of the present disclosure.

FIG. 3 illustrates a schematic representation of an exemplary embodiment 100 of a system for monitoring and maintaining a fleet of electric vehicles of FIG. 1 in accordance with an embodiment of the present disclosure. Consider an example, where the system 100 is utilized by a fleet management company 'A' for managing its one or more commercial electric vehicles 115 deployed at several geographical locations of a country. In the example used herein, the fleet management company may include a bike rental company which provides a service of renting the fleet of electric vehicles 115 to one or more customers. The system 100 utilized by the fleet management company 'A' helps in remote monitoring and maintaining the fleet of the electric vehicles across the various geographical locations by analyzing and assessing several factors related to operation of the fleet of the electric vehicles.

The system 100 includes a processing subsystem 105 which is hosted on a cloud server 108 and communicates via a wireless communication network 109 to control bidirectional communications among a plurality of modules. The processing subsystem 105 includes an electric vehicle data tracking module 110 to track vehicle data associated with each electric vehicle in the fleet of electric vehicles collected via one or more sensors. Here, the one or more sensors are deployed in each of the fleet of electric vehicles. For example, the vehicle data associated with each of the electric vehicle in the fleet of the electric vehicles may include at least one of vehicle location data, vehicle dynamics data, electric vehicle power discharging characteristics data, electric vehicle recharging characteristics data, operator characteristics data, electric vehicle distance data, vehicle ridership data, electric vehicle environment exposure data, electric vehicle route data, electric vehicle maintenance data or a combination thereof. In the example used herein, the one or more sensors may include but not limited to, an inertial measurement unit sensor, a brake position sensor, an accelerator position sensor, a geospatial location sensor and the like.

Here, the vehicle location data may include data of one or more georeferenced routes traversed by each of the electric vehicles. The data of the one or more georeferenced routes are derived based on one or more time series values of geospatial locations and other time series parameters. In one implementation, the system records timestamped geospatial locations of a vehicle over time. For example, the system may record the one or more time series values of the geospatial locations recorded by a geospatial sensor which is integrated into the electric vehicle, arranged in a black box located in each of the electric vehicle, or integrated into mobile computing devices issued to operators operating each of the electric vehicle in the feet of the electric vehicles over time. Based on the one or more timestamped geospatial locations of each of the electric vehicles collected over time, the electric vehicle data tracking module automatically derives a georeferenced route traversed by the vehicle. The electric vehicle data tracking module 110 calculates one or multiple unique routes that each of the electric vehicle has traversed in the past based on these timestamped geospatial location data, such as including: common routes, common stops along the one or more georeferenced routes, common or average durations of stops along the one or more georeferenced routes, specific traffic lanes traversed along the one or more georeferenced routes and the like.

Again, the vehicle recharging characteristics may include one or more timestamped values representative of battery current draw and energy delivery rate, battery current supply rate and energy supply rate, battery charge state, battery temperature values or a combination thereof. Similarly, the vehicle data may also include environmental exposure data which may include ambient temperature, ambient humidity, altitude, ultraviolet exposure, rain, or snow precipitation in the one or more georeferenced routes traversed by each of the electric vehicles in the fleet of the electric vehicles. In another example, the electric vehicle maintenance data may include at least one of date and description of replacement of vehicle tyres, date and description of battery repair and replacement, date and description of motor repair and replacement, date and description of compression repair and replacement, date of interior or exterior cleaning of the electric vehicle, date and description of aesthetic repairs performed on the electric vehicle or a combination thereof. Again, the operator data may include at least one of a date of operation of each of the electric vehicle by an operator, a name of the operator operated each of the electric vehicle, a time of operation of each of the electric vehicle by the operator, a location of operation of the electric vehicle performed by the operator or a combination thereof. Further, the ridership data may include a location and time details of one or more riders along the one or more georeferenced routes, wherein the location and the time details are obtained by combination of one or more timestamps of fare payments by the one or more riders at each of the electric vehicle and concurrent georeferenced location data of each of the electric vehicle or time-referenced durations for detection of each unique face of the one or more riders in a captured video feed and concurrent georeferenced location data of each of the electric vehicle.

Once the vehicle data is received associated with several parameters, a fleet vehicle profile management module 120 generates a unique vehicle profile corresponding to each of the electric vehicles in the fleet of the electric vehicles upon tracking of the vehicle data. The unique vehicle profile for each electric vehicle in the fleet of the electric vehicles is linked with a unique vehicle identification number (VIN). For example, the vehicle data which is obtained tracking is entered into the unique vehicle profile linked with the unique VIN manually by scanning a unique code in each of the electric vehicles in the fleet of electric vehicles. In another example, the vehicle data upon tracking may be entered into the unique vehicle profile by querying a vehicle data repository.

Also, the fleet vehicle profile management module 120 maintains the vehicle data linked with the unique vehicle profile generated for each of the electric vehicles in the fleet of electric vehicles in the vehicle data repository 125. For example, the vehicle data repository 125 also stores static data representative of each of the electric vehicles in the fleet of the electric vehicles 115. In the example used herein, the static data may include at least one of a model details of the electric vehicle, a type of the electric vehicle, a class of the electric vehicle, a curb weight of the electric vehicle, a load capacity of the electric vehicle, a rider capacity of the electric vehicle, a date of manufacture of the electric vehicle, a date of deployment of the electric vehicle, a battery of the electric vehicle, a motor size of the electric vehicle or a combination thereof.

Again, an electric vehicle objective computation module 130 of the processing subsystem 105, interfaces with the vehicle data repository for utilization of one or more predefined fleet level objectives. For example, the one or more predefined fleet-level objectives corresponding to each of the electric vehicles in the fleet of the electric vehicles are maintained in the vehicle data repository 125. In the example used herein, the one or more predefined fleet-level objectives may include at least one of maximizing utilization, achieving target equipment life, maximizing equipment reliability, maximizing battery life, maximizing capacity over effective operating life of the electric vehicle, minimizing probability of equipment failures, minimizing environmental impact or a combination thereof. In one implementation, a fleet manager portal may present the one or more predefined fleet-level objectives to a fleet manager, and the fleet manager can selectively activate and deactivate the one or more predefined fleet-level objectives, such as by selecting adjacent checkboxes or selecting the one or more predefined fleet level objectives from a dropdown menu presented in the fleet manager portal. Alternatively, the fleet manager portal may present the one or more predefined fleet-level objectives and prompt a user to prioritize or rank such objectives such as by entering a priority value e.g., between "0" and "10" adjacent to each objective or moving a particular objective within the one or more predefined fleet-level objectives to indicate rank or priority.

The electric vehicle objective computation module 130 also ranks the one or more predefined fleet-level objectives in a predefined order for operation of each of the electric vehicle in the fleet of the electric vehicles by interfacing with the fleet manager. The one or more predefined fleet level objectives assigned to one electric vehicle in the fleet of the electric vehicles are stored as a record in the unique vehicle profile associated with this particular vehicle. The electric vehicle objective computation module repeats this process for each individual electric vehicles and the fleet of the electric vehicles of the same or similar make, model, class, or type, and the like to populate corresponding unique vehicle profiles with the one or more predefined fleet-level objectives.

Upon ranking of the one or more predefined fleet-level objectives, a fleet score computation module 140 employs a predefined score model in real-time to calculate a vehicle level score corresponding to each of the one or more fleet level objectives for each of the electric vehicles in the fleet of the electric vehicles. For example, whenever for an individual electric vehicle, the vehicle level score needs to be computed, the predefined score model is employed for calculation. Here the predefined score model which is employed is created by using machine learning technique based on historical datasets of vehicle data aggregated. In the example used herein, the vehicle level score calculated for each of the electric vehicles corresponding to each of the one or more predefined fleet-level objectives are calculated on a scale from e.g., zero to hundred. The fleet score computation module 140 also calculates a fleet level score corresponding to each of the one or more fleet level objectives ranked in the predefined order for the fleet of the electric vehicles by combining the vehicle level score calculated. Here, the fleet score computation module 140 combines the vehicle-level score by calculating an average or non-linear combination, such as with lower vehicle-level score weighted higher to calculate the fleet-level score for a particular fleet-level objective.

In addition, the fleet score computation module 140 is also configured to compute a fleet-level aggregate score for the fleet of the electric vehicles based on a combination of each of the fleet level scores calculated using a score combination technique. In one example, the score combination technique for computation of the fleet-level aggregate score may include a weighted average of the fleet level score calculated for the fleet of the electric vehicles according to weights or rank assigned to the one or more predefined fleet-level objectives.

Also, the fleet score computation module 140 calculates a change in the fleet level scores and the fleet-level aggregate scores respectively of the fleet of the electric vehicles with respect to a predefined time interval. In such embodiment, the predefined time interval may include, but not limited to, a current day, week, month, quarter, year, or since the fleet manager last accessed the fleet manager portal. The fleet score computation module is also configured to derive correlations for injecting into a fleet action model based on the change detected between the fleet level scores and the fleet-level aggregate scores, respectively. For example, for each fleet level objective, the fleet score computation module calculates a trendline for historical objective-specific scores for this objective up to a current time implement a low-pass filter to reject noise in this trendline and calculates a derivative of the trendline at the current time, such as total rate of change over the past 24 hours, the past week, the past month, the past quarter, and/or the past year.

Once, the different scores associated with the fleet of the electric vehicles are computed, a generic fleet action implementation module 150 utilizes an implemented fleet action model based on the fleet-level aggregate score for predicting maintenance and performance of the fleet of the electric vehicles through a plurality of vehicle specific actions. In the example used herein, the plurality of vehicle specific actions may include at least one of redistributing operators of the feet of electric vehicles, redistributing the fleet of electric vehicles across the one or more georeferenced routes, changing charge timings for the fleet of the electric vehicles, replacing an individual electric vehicle in the fleet of the electric vehicles, changing a target battery capacity of the fleet of the electric vehicles, replacing drivetrain components within the fleet of the electric vehicles, repairing the fleet of the electric vehicles or a combination thereof. Here, the fleet action model predicts how objective-specific and the fleet-level aggregate scores for a generic electric vehicle fleet may be affected by various vehicle specific actions.

Further, an action verification module 160 of the processing subsystem 105, receives verification of implementation of the plurality of vehicle specific actions across the fleet of the electric vehicles via one or more verification means. For example, the one or more verification means may include, but not limited to, a verification of automated scheduled implementation details of the plurality of vehicle specific actions, a verification of implementation details of the plurality of vehicle specific actions based on manual intervention and the like. Thus, the action verification module 160 collects vehicle operational data from the fleet, schedules or prompts the plurality of vehicle specific actions, verifies whether the plurality of vehicle specific actions implemented or not, and detects correlations between such actions and changes in the fleet-level or vehicle-level outcomes for the fleet of the electric vehicles for assisting the fleet management company.

Figure 4:
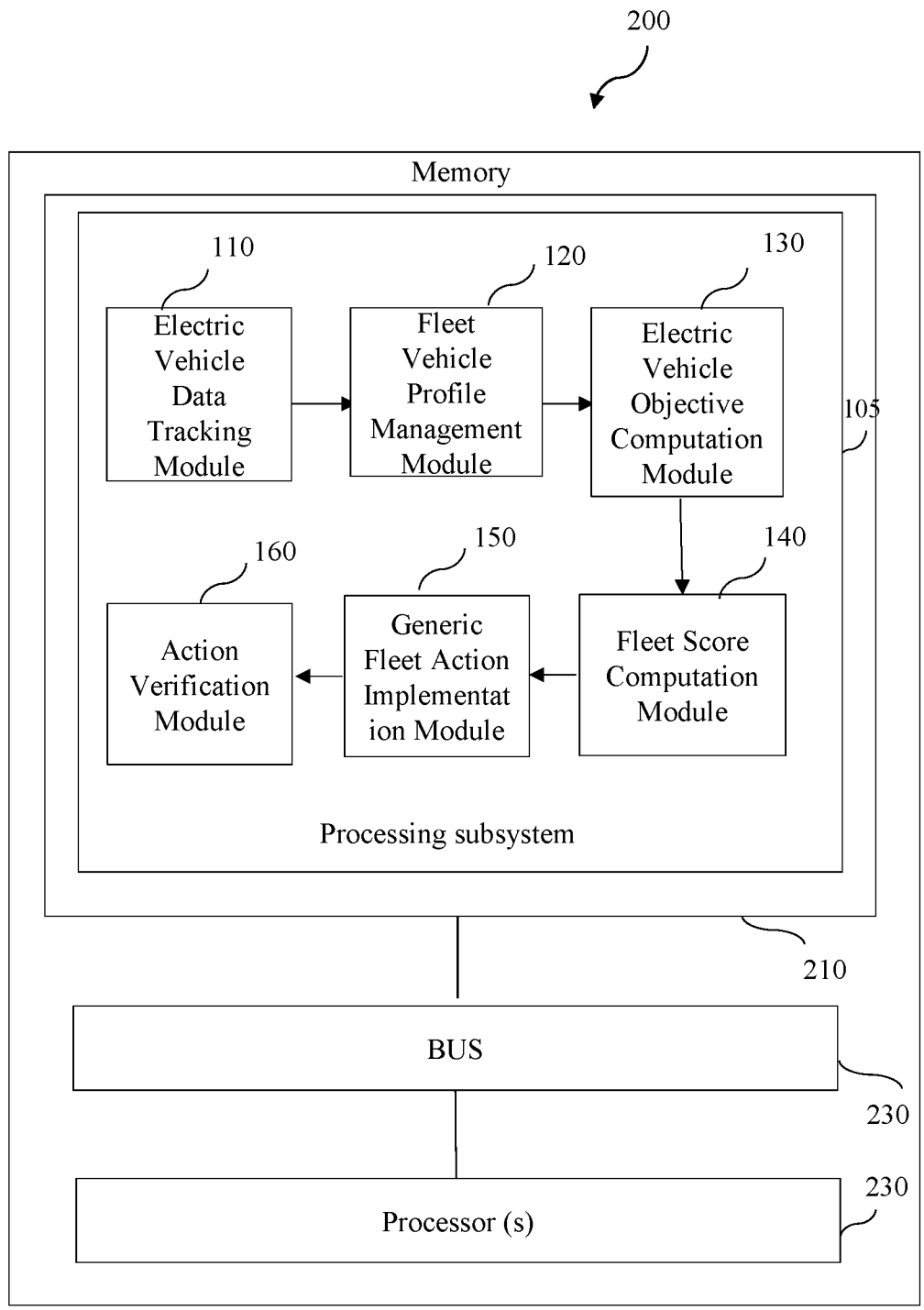
FIG. 4 is a block diagram of a computer or a server in accordance with an embodiment of the present disclosure.

FIG. 4 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of an executable program which instructs the processor 230 to perform the method steps illustrated in FIG. 1. The memory 210 is substantially similar to a system 100 of FIG. 1. The memory 210 has following elements: a processing subsystem 105 which includes an electric vehicle data tracking module 110, a fleet vehicle profile management subsystem 120, an electric vehicle objective computation module 130, a fleet score computation module 140, a generic fleet action implementation module 150 and an action verification module 160.

The processing subsystem 105 includes an electric vehicle data tracking module 110 configured to track vehicle data associated with each electric vehicle in the fleet of electric vehicles collected via one or more sensors, wherein the one or more sensors are deployed in each of the fleet of the electric vehicles and the charging infrastructure that includes, e.g., chargers and electric utility infrastructure. The processing subsystem 105 also includes a fleet vehicle profile management module 120 is configured to generate a unique vehicle profile corresponding to each of the electric vehicles in the fleet of the electric vehicles upon tracking of the vehicle data. The fleet vehicle profile management module 120 is also configured to maintain the vehicle data linked with the unique vehicle profile generated for each of the electric vehicles in the fleet of electric vehicles in a vehicle data repository. The processing subsystem 105 also includes an electric vehicle objective computation module 130 configured to utilize one or more predefined fleet-level objectives corresponding to each of the electric vehicle in the fleet of the electric vehicles, wherein the one or more predefined fleet-level objectives are maintained by the electric vehicle objective computation module. The electric vehicle objective computation module 130 is also configured to rank the one or more predefined fleet-level objectives in a predefined order for operation of each of the electric vehicle in the fleet of the electric vehicles by interfacing with a fleet manager. The processing subsystem also includes a fleet score computation module 140 configured to employ a predefined score model to calculate a vehicle level score corresponding to each of the one or more fleet level objectives ranked in the predefined order for each of the electric vehicles in the fleet of the electric vehicles. The fleet score computation module 140 is also configured to calculate a fleet level score corresponding to each of the one or more fleet level objectives ranked in the predefined order for the fleet of the electric vehicles by combining the vehicle level score calculated. The fleet score computation module 140 is also configured to compute a fleet-level aggregate score for the fleet of the electric vehicles based on a combination of each of the fleet level scores calculated using a score combination technique. The processing subsystem also includes a generic fleet action implementation module 150 configured to utilize an implemented fleet action model based on the fleet-level aggregate score for predicting maintenance and performance of the fleet of the electric vehicles through a plurality of vehicle specific actions. The action verification module 160 is configured to receive verification of implementation of the plurality of vehicle specific actions across the fleet of the electric vehicles via one or more verification means.

The bus 220 as used herein refers to internal memory channels or computer networks that are used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus, and the like.

Figure 5A:
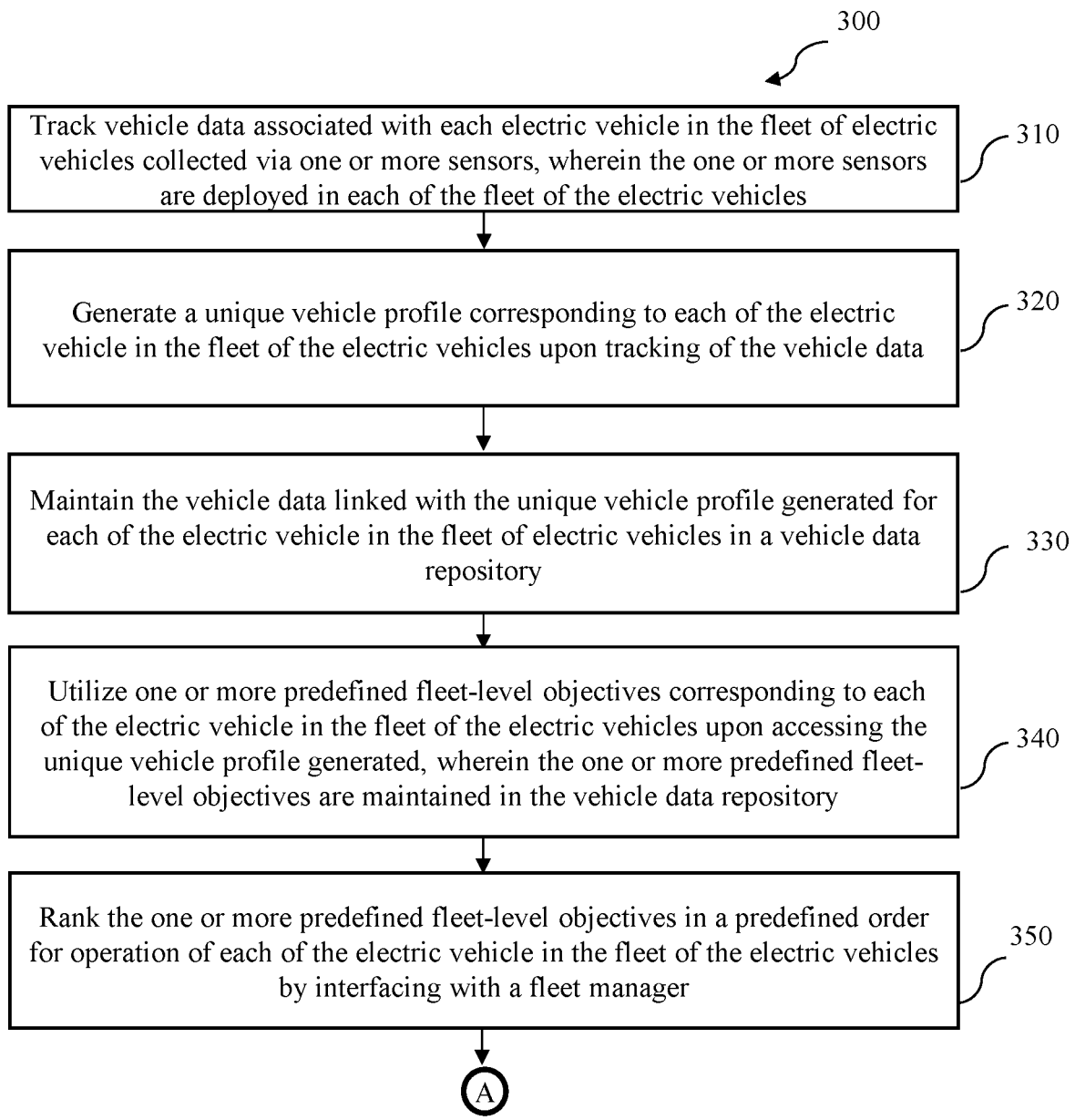
FIG. 5 (*a*) and FIG. 5 (*b*) is a flow chart representing the steps involved in a method for monitoring and maintaining a fleet of electric vehicles in accordance with the embodiment of the present disclosure.
Figure 5B:
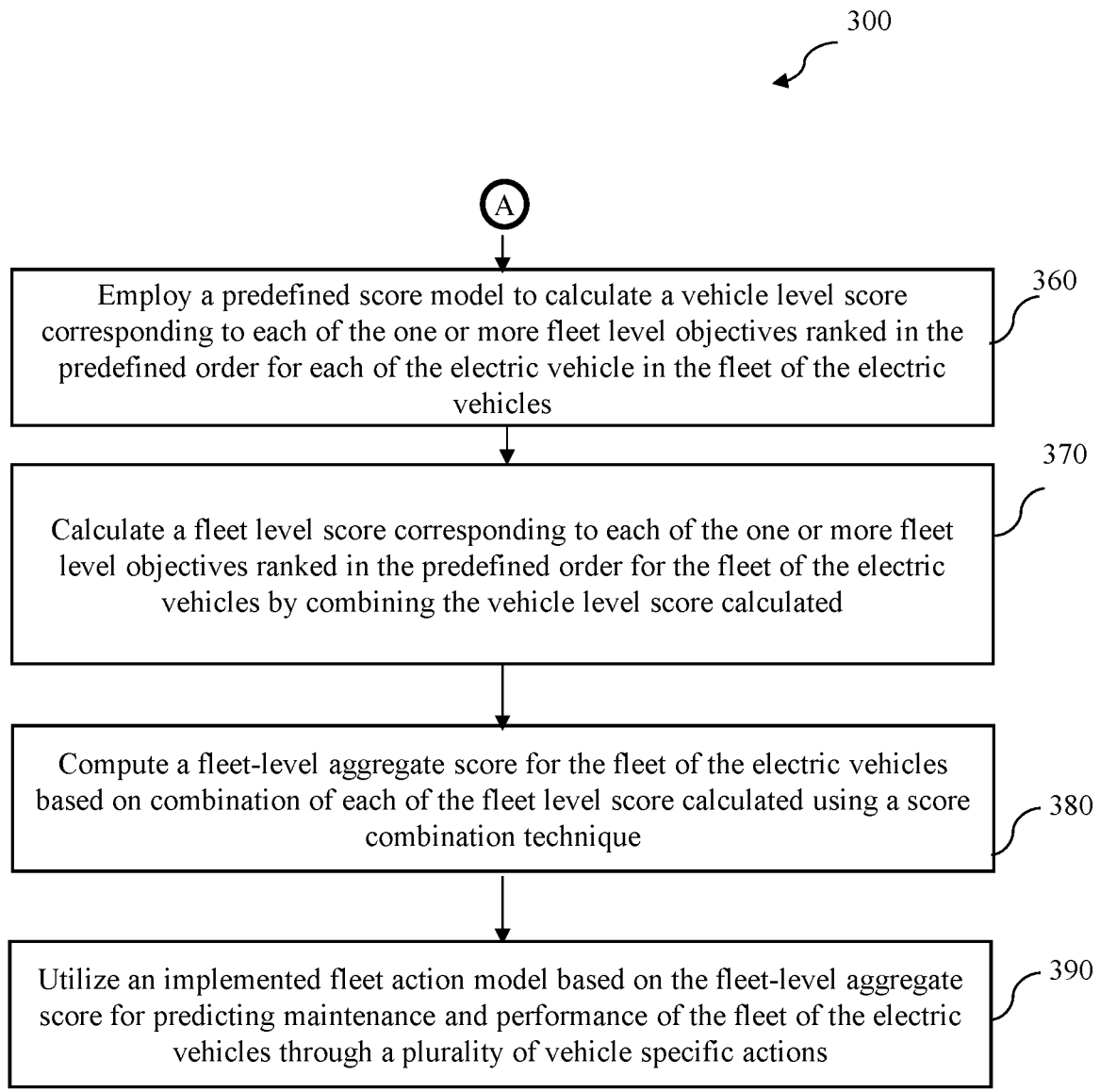

FIG. 5(a) and FIG. 5 (b) is a flow chart representing the steps involved in a method 300 for monitoring and maintaining a fleet of electric vehicles in accordance with the embodiment of the present disclosure. The method 300 includes tracking, by an electric vehicle data tracking module, vehicle data associated with each electric vehicle in the fleet of electric vehicles collected via one or more sensors, wherein the one or more sensors are deployed in each of the fleet of the electric vehicles in step 310. In one embodiment, tracking the vehicle data associated with each of the electric vehicle in the fleet of the electric vehicles may include tracking the vehicle data associated with each of the electric vehicle in the fleet of the electric vehicles may include at least one of vehicle location data, vehicle dynamics data, electric vehicle power discharging characteristics data, electric vehicle recharging characteristics data, operator characteristics data, electric vehicle distance data, vehicle ridership data, electric vehicle environment exposure data, electric vehicle maintenance data or a combination thereof. In some embodiment, tracking the vehicle data associated with each of the electric vehicle in the fleet of the electric vehicles may include tracking the vehicle data collected from the one or more sensors including, but not limited to, an inertial measurement unit sensor, a brake position sensor, an accelerator position sensor, a geospatial location sensor and the like.

The method 300 also includes generating, by a fleet vehicle profile management module, a unique vehicle profile corresponding to each of the electric vehicles in the fleet of the electric vehicles upon tracking of the vehicle data in step 320. In one embodiment, generating the unique vehicle profile corresponding to each of the electric vehicles in the fleet of the electric vehicles includes generating the unique vehicle profile linked with a unique vehicle identification number (VIN). In a specific embodiment, the vehicle data may be entered into the unique vehicle profile linked with the unique VIN by manually scanning a unique code in each of the electric vehicles in the fleet of electric vehicles. In another embodiment, the vehicle data upon tracking may be entered into the unique vehicle profile by querying a vehicle data repository.

The method 300 also includes maintaining, by the fleet vehicle profile management module, the vehicle data linked with the unique vehicle profile generated for each of the electric vehicles in the fleet of electric vehicles in a vehicle data repository in step 330. In a specific embodiment, the vehicle data repository also stores static data representative of each of the electric vehicles in the fleet of the electric vehicles. In such embodiment, the static data may include at least one of a model details of the electric vehicle, a type of the electric vehicle, a class of the electric vehicle, a curb weight of the electric vehicle, a load capacity of the electric vehicle, a rider capacity of the electric vehicle, a date of manufacture of the electric vehicle, a date of deployment of the electric vehicle, a battery of the electric vehicle, a motor size of the electric vehicle or a combination thereof.

The method 300 also includes utilizing, by an electric vehicle objective computation module, one or more predefined fleet-level objectives corresponding to each of the electric vehicle in the fleet of the electric vehicles, wherein the one or more predefined fleet-level objectives are maintained in the vehicle data repository in step 340. In one embodiment, utilizing the one or more predefined fleet-level objectives corresponding to each of the electric vehicle in the fleet of the electric vehicles may include utilizing at least one of maximizing utilization, achieving target equipment life, maximizing equipment reliability, maximizing battery life, maximizing capacity over effective operating life of the electric vehicle, minimizing probability of equipment failures, minimizing environmental impact or a combination thereof. The method 300 also includes ranking, by the electric vehicle objective computation module, the one or more predefined fleet-level objectives in a predefined order for operation of each of the electric vehicles in the fleet of the electric vehicles by interfacing with a fleet manager in step 350.

The method 300 also includes employing, by a fleet score computation module, a predefined score model to calculate a vehicle level score corresponding to each of the one or more fleet level objectives ranked in the predefined order for each of the electric vehicles in the fleet of the electric vehicles in step 360. In one embodiment, calculating the vehicle level score corresponding to each of the one or more fleet-level objectives for each of the electric vehicle in the fleet of the electric vehicles may include calculating the vehicle level score for each of the electric vehicle corresponding to each of the one or more predefined fleet-level objectives on a scale from zero to hundred.

The method 300 also includes calculating, by the fleet score computation module, a fleet level score corresponding to each of the one or more fleet level objectives ranked in the predefined order for the fleet of the electric vehicles by combining the vehicle level score calculated in step 370. In one embodiment, combining the vehicle level score for calculation of the fleet level score may include combining the vehicle level score by calculating an average or by non-linear combination of the vehicle level scores. The method 300 also includes computing, by the fleet score computation module, a fleet-level aggregate score for the fleet of the electric vehicles based on the combination of each of the fleet level scores calculated using a score combination technique in step 380. In some embodiments, the score combination technique may include a weighted average of the fleet level score calculated for the fleet of the electric vehicles according to weights or rank assigned to the one or more predefined fleet-level objectives. In another embodiment, the score combination technique may include a machine learning algorithm where the inputs are the fleet level score calculated for the fleet of the electric vehicles according to weights or rank assigned to the one or more predefined fleet-level objectives.

The method 300 also includes utilizing, by a generic fleet action implementation module, an implemented fleet action model based on the fleet-level aggregate score for predicting maintenance and performance of the fleet of the electric vehicles through a plurality of vehicle specific actions in step 390. In one embodiment, utilizing the implemented fleet action model for predicting the maintenance and the performance of the fleet of the electric vehicles through the plurality of vehicle specific actions may include predicting the maintenance and the performance of the fleet of the electric vehicles through at least one of redistributing operators of the feet of electric vehicles, redistributing the fleet of electric vehicles across the one or more georeferenced routes, changing charge timings for the fleet of the electric vehicles, replacing an individual electric vehicle in the fleet of the electric vehicles, changing a target battery capacity of the fleet of the electric vehicles, replacing drivetrain components within the fleet of the electric vehicles, repairing the fleet of the electric vehicles or a combination thereof.

In a specific embodiment, the method 300 further includes receiving, by an action verification module of a processing subsystem, verification of implementation of the plurality of vehicle specific actions across the fleet of the electric vehicles via one or more verification means. In such embodiment, receiving the verification of the implementation of the plurality of vehicle specific actions may include receiving a verification of automated scheduled implementation details of the plurality of vehicle specific actions, a verification of implementation details of the plurality of vehicle specific actions based on manual intervention and the like.

Various embodiments of the present disclosure provide a system which helps in tracking vehicle operational data for monitoring as well as maintenance of the fleet of the electric vehicles thereby helps in predicting maintenance, use, costs charging, discharging, and/or other changes across the fleet or at specific vehicles to achieve better performance.

Moreover, the present disclosed system helps in remote monitoring of the condition of the fleet of the electric across various geographical locations and thereby helps in planning, resource management and operational growth of a fleet manager to achieve desired results.

Furthermore, the present disclosed system for maintain the fleet of the electric vehicles utilizes several fleet level objectives to assess risk related to leasing of the fleet of the electric vehicles, to assess risk related to battery performance warranties for the fleet of the electric vehicles in the fleet and/or to manage costs related to warranty, leasing, or depreciation of the fleet of the electric vehicles or its one or more components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A Machine Learning (ML)-based computer-implemented system for remote monitoring and maintaining a fleet of electric vehicles comprising:
one or more sensors configured to collect vehicle data associated with each electric vehicle in the fleet of electric vehicles, wherein each of the electric vehicle within the fleet of electric vehicles is located at distinct and instantaneously changing locations; and
a server comprising:
one or more processors; and
a memory coupled to the one or more processors, wherein the memory comprises a set of program instructions in form of a plurality of modules, configured to be executed by the one or more processors, wherein the plurality of modules comprises:
an electric vehicle data tracking module configured to track the vehicle data associated with each of the electric vehicle in the fleet of electric vehicles collected via the one or more sensors, wherein the one or more sensors are deployed in each of the fleet of the electric vehicles and associated charging infrastructure;
a fleet vehicle profile management module operatively coupled to the electric vehicle data tracking module, wherein the fleet vehicle profile management module is configured to:
generate a unique vehicle profile corresponding to each of the electric vehicle in the fleet of the electric vehicles upon tracking of the vehicle data; and
maintain the vehicle data linked with the unique vehicle profile generated for each of the electric vehicle in the fleet of electric vehicles in a vehicle data repository;
an electric vehicle objective computation module operatively coupled to the fleet vehicle profile management module, wherein the electric vehicle objective computation module is configured to:
utilize one or more predefined fleet-level objectives corresponding to each of the electric vehicle in the fleet of the electric vehicles upon accessing the unique vehicle profile generated, wherein the one or more predefined fleet-level objectives are maintained in the vehicle data repository, wherein the one or more predefined fleet-level objectives is associated with one or more goals for the fleet of electric vehicles to determine performance of each of the electric vehicle in the fleet of the electric vehicles, and wherein the one or more predefined fleet-level objectives comprises at least one of: maximizing utilization, achieving target equipment life, maximizing equipment reliability, maximizing battery life, maximizing capacity over effective operating life of the electric vehicle, minimizing probability of equipment failures, and minimizing environmental impact; and
rank the one or more predefined fleet-level objectives in a predefined order for operation of each of the electric vehicle in the fleet of the electric vehicles by interfacing with a fleet manager;
a fleet score computation module operatively coupled to the electric vehicle objective computation module, wherein the fleet score computation module is configured to:
compute a vehicle level score corresponding to each of the one or more predefined fleet-level objectives ranked in the predefined order for each of the electric vehicle in the fleet of the electric vehicles, in real time using a machine learning based predefined score model, wherein the machine learning based predefined score model is configured to obtain at least one of: a vector and a graph to compute the vehicle level score for each of the vehicle in the fleet of electric vehicles;

compute a fleet-level score corresponding to each of the one or more predefined fleet-level objectives ranked in the predefined order for the fleet of the electric vehicles by combining the computed vehicle level score;

compute a fleet-level aggregate score for the fleet of the electric vehicles based on combination of each of the computed fleet-level score using a score combination technique; and compute a change in the fleet level scores and the fleet-level aggregate scores respectively of the fleet of the electric vehicles for a predefined time interval, wherein for each of the one or more predefined fleet-level objectives, the fleet score computation module is configured to:

determine a trendline for historical objective-specific scores for each of the one or more predefined fleet-level objectives up to a current time:

implement a low-pass filter to reject noise in the trendline; and determine a derivative of the trendline at the current time, wherein the derivative of the trendline is the total change over the predefined time interval; and a generic fleet action implementation module operatively coupled to the fleet-level score computation module, wherein the generic fleet action implementation module is configured to utilize an implemented fleet action model based on the fleet-level aggregate score for predicting maintenance and performance of the fleet of the electric vehicles through a plurality of vehicle specific actions.

2. The system of claim 1, wherein the vehicle data comprise at least one of: vehicle location data, vehicle dynamics data, electric vehicle power discharging characteristics data, electric vehicle recharging characteristics data, operator characteristics data, electric vehicle distance data, vehicle ridership data, electric vehicle environment exposure data, and electric vehicle maintenance data.

3. The system of claim 2, wherein the vehicle location data comprise data of one or more georeferenced routes traversed by each of the electric vehicle, wherein the data of the one or more georeferenced routes are derived based on one or more time series values of geospatial locations.

4. The system of claim 2, wherein the vehicle recharging characteristics data comprise one or more timestamped values representative of battery current draw and energy delivery rate, battery current supply rate and energy supply rate, battery charge state, and battery temperature values.

5. The system of claim 2, wherein the environmental exposure data comprise ambient temperature, altitude, traffic, ambient humidity, ultraviolet exposure, rain, or snow precipitation in the one or more georeferenced routes traversed by each of the electric vehicle in the fleet of the electric vehicles.

6. The system of claim 2, wherein the electric vehicle maintenance data comprise at least one of: date and description of replacement of vehicle tyres, date and description of battery repair and replacement, date and description of motor repair and replacement, date and description of compression repair and replacement, date of interior or exterior cleaning of the electric vehicle, and date and description of aesthetic repairs performed on the electric vehicle.

7. The system of claim 2, wherein the operator data comprise at least one of: a date of operation of each of the electric vehicle by an operator, a name of the operator operated each of the electric vehicle, a time of operation of each of the electric vehicle by the operator, and a location of operation of the electric vehicle performed by the operator.

8. The system of claim 2, wherein the ridership data comprise a location and time details of one or more riders along the one or more georeferenced routes, wherein the location and the time details are obtained by combination of one or more timestamps of fare payments by the one or more riders at each of the electric vehicle and concurrent georeferenced location data of each of the electric vehicle or time-referenced durations for detection of each unique face of the one or more riders in a captured video feed and concurrent georeferenced location data of each of the electric vehicle.

9. The system of claim 1, wherein the one or more sensors comprises at least one of: an inertial measurement unit sensor, a brake position sensor, an accelerator position sensor, and a geospatial location sensor.

10. The system of claim 1, wherein the fleet of the electric vehicles comprises a fleet of electric bikes, a fleet of electric buses, a fleet of electric vans, a fleet of electric cars, a fleet of electric trains, a fleet of electric trams, and a fleet of electric trolleys.

11. The system of claim 1, wherein the vehicle data repository is further configured to store static data representative of each of the electric vehicle in the fleet of the electric vehicles, wherein the static data comprise at least one of: a model details of the electric vehicle, a type of the electric vehicle, a class of the electric vehicle, a curb weight of the electric vehicle, a load capacity of the electric vehicle, a rider capacity of the electric vehicle, a date of manufacture of the electric vehicle, a date of deployment of the electric vehicle, a battery of the electric vehicle, and a motor size of the electric vehicle.

12. The system of claim 1, wherein the vehicle level score is computed for each of the one or more predefined fleet-level objectives on a scale from zero to hundred.

13. The system of claim 1, wherein the score combination technique comprises a weighted average of the fleet-level score computed for the fleet of the electric vehicles based on at least one of: weights and rank assigned to the one or more predefined fleet-level objectives.

14. The system of claim 1, wherein the fleet score computation module is also configured to:

compute a change in the fleet-level scores and the fleet-level aggregate scores respectively of the fleet of the electric vehicles with respect to a predefined time interval; and derive correlations for injecting into the fleet action model based on the change detected between the fleet-level scores and the fleet-level aggregate scores, respectively.

15. The system of claim 1, wherein the plurality of vehicle specific actions comprises at least one of: redistributing operators of the feet of electric vehicles, redistributing the fleet of electric vehicles across the one or more georeferenced routes, changing charge timings, amount of charge, and rate of charge for the fleet of the electric vehicles, replacing an individual electric vehicle in the fleet of the electric vehicles, changing a target battery capacity of the fleet of the electric vehicles, replacing drivetrain components within the fleet of the electric vehicles, and repairing the fleet of the electric vehicles.

16. The system of claim 1, further comprising an action verification module configured to receive verification of implementation of the plurality of vehicle specific actions across the fleet of the electric vehicles via one or more verification means.

17. A Machine Learning (ML)-based computer-implemented method comprising:
- collecting, by one or more sensors, vehicle data associated with each electric vehicle in a fleet of electric vehicles, wherein each of the electric vehicle within the fleet of electric vehicles is located at distinct and instantaneously changing locations;
- tracking, by an electric vehicle data tracking module, the vehicle data associated with each electric vehicle in the fleet of electric vehicles collected via the one or more sensors, wherein the one or more sensors are deployed in each of the fleet of the electric vehicles and associated charging infrastructure;
- generating, by a fleet vehicle profile management module, a unique vehicle profile corresponding to each of the electric vehicle in the fleet of the electric vehicles upon tracking of the vehicle data;
- maintaining, by the fleet vehicle profile management module, the vehicle data linked with the unique vehicle profile generated for each of the electric vehicle in the fleet of electric vehicles in a vehicle data repository;
- utilizing, by an electric vehicle objective computation module, one or more predefined fleet-level objectives corresponding to each of the electric vehicle in the fleet of the electric vehicles upon accessing the unique vehicle profile generated, wherein the one or more predefined fleet-level objectives are maintained in the vehicle data repository, wherein the one or more predefined fleet-level objectives is associated with one or more goals for the fleet of electric vehicles to determine performance of each of the electric vehicle in the fleet of the electric vehicles, and wherein the one or more predefined fleet-level objectives comprises at least one of: maximizing utilization, achieving target equipment life, maximizing equipment reliability, maximizing battery life, maximizing capacity over effective operating life of the electric vehicle, minimizing probability of equipment failures, and minimizing environmental impact;
- ranking, by the electric vehicle objective computation module, the one or more predefined fleet-level objectives in a predefined order for operation of each of the electric vehicle in the fleet of the electric vehicles by interfacing with a fleet manager;
- computing, by a fleet-score computation module, a vehicle level score corresponding to each of the one or more predefined fleet-level objectives ranked in the predefined order for each of the electric vehicle in the fleet of the electric vehicles, in real time using a machine learning based predefined score model, wherein the machine learning based predefined score model is configured to obtain at least one of: a vector and a graph to compute the vehicle level score for each of the vehicle in the fleet of electric vehicles;
- computing, by the fleet score computation module, a fleet-level score corresponding to each of the one or more predefined fleet-level objectives ranked in the predefined order for the fleet of the electric vehicles by combining the computed vehicle level score;
- computing, by the fleet score computation module, a fleet-level aggregate score for the fleet of the electric vehicles based on combination of each of the computed fleet-level score using a score combination technique;
- computing by the fleet score computation module, a change in the fleet level scores and the fleet-level aggregate scores respectively of the fleet of the electric vehicles for a predefined time interval, compute a change in the fleet level scores and the fleet-level aggregate scores respectively of the fleet of the electric vehicles for a predefined time interval, wherein for each of the one or more predefined fleet-level objectives, the fleet score computation module is configured to:
  - determine a trendline for historical objective-specific scores for each of the one or more predefined fleet-level objectives up to a current time;
  - implement a low-pass filter to reject noise in the trendline; and
  - determine a derivative of the trendline at the current time,
  wherein the derivative of the trendline is the total change over the predefined time interval; and
- utilizing, by a generic fleet action implementation module, an implemented fleet action model based on the fleet-level aggregate score for predicting maintenance and performance of the fleet of the electric vehicles through a plurality of vehicle specific actions.

18. The method of claim 17, wherein combining the vehicle level score for computation of the fleet level score comprises combining the vehicle level score by computing an average or by non-linear combination of the vehicle level scores.

* * * * *